May 10, 1938.  J. A. NEFF  2,117,206
FISHING LURE
Filed Nov. 11, 1936   2 Sheets-Sheet 1

Inventor
J. A. Neff
By L. F. Randolph
Attorney

May 10, 1938.    J. A. NEFF    2,117,206
FISHING LURE
Filed Nov. 11, 1936    2 Sheets-Sheet 2

Inventor
J. A. Neff
By L. F. Laudreth
Attorney

Patented May 10, 1938

2,117,206

UNITED STATES PATENT OFFICE 2,117,206

FISHING LURE

James A. Neff, Dover Center, Ohio

Application November 11, 1936, Serial No. 110,360

1 Claim. (Cl. 43—46)

This invention relates to a fishing lure and it aims generally to provide a novel construction which is artificial and more effective and more specifically, it aims to provide a lure having a body which is diaphanous and contains on its exterior closely arranged reflecting portions, preferably in concavities serving not only to provide an exterior reflecting surface and luring appearance, but also providing a structure wherein light may enter the body between the mirror portions and be reflected from the inner surfaces of the reflecting portions through the spaces or zones between the reflectors.

It is also aimed to provide such a construction wherein it may be rendered luminous on the interior, if desired.

The more specific objects and advantages will become apparent from a consideration of the description following taken in connection with accompanying drawings illustrating an operative embodiment.

In said drawings:—

Figure 1:
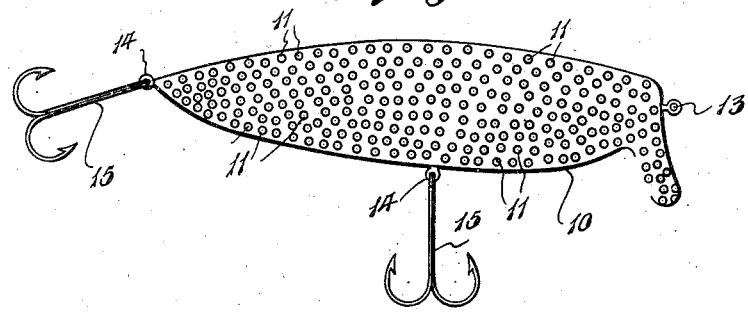
Figure 1 is a side elevation of a fishing lure constructed in accordance with the invention.
Figure 2:
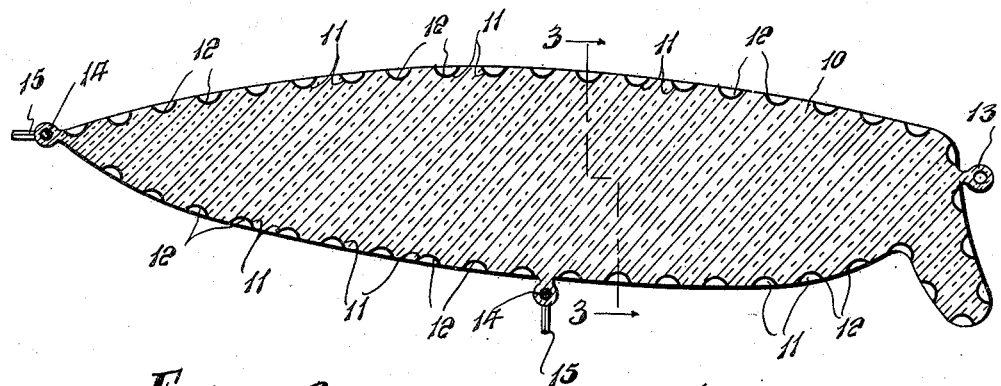
Figure 2 is a central longitudinal sectional view through the lure of Figure 1.
Figure 3:
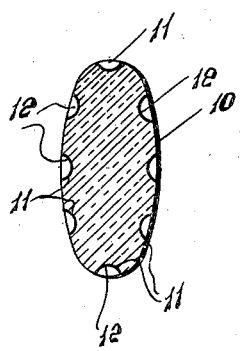
Figure 3 is a detail cross section taken on the line 3—3 of Figure 2.
Figure 4:
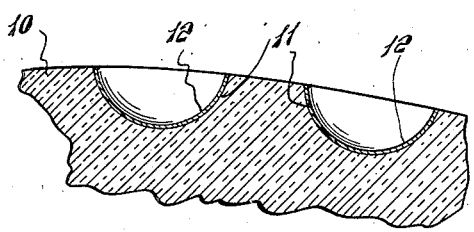
Figure 4 is an enlarged fragmentary longitudinal sectional view through the lure.

Referring specifically to the drawings and first to the form of Figures 1 to 4, a body or lure is provided at 10, which is diaphanous, that is either transparent or translucent. On the exterior surface, said lure or body 10 is provided with a multiplicity of relatively close partly spherical cavities 11. Each of such cavities has a lining or coating 12 providing mirrors or reflectors. In addition, the body has an eyelet 13 integral with it or in any suitable manner connected to it, so that a line may be attached and further, the body has integral or otherwise provided eyes or eyelets at 14, to which conventional hooks 15 are preferably pivotally connected.

Said lures or bodies 10 may be in one piece. They may be made either floating or sinking, hollow or solid, of all sizes, and all clear, colored, vari-colored and all combinations of colored lures, made for instance of glass, pyralin and all unbreakable, transparent and translucent material.

The invention not only displays its external appearance but particularly reflects any and all available light through the transparent and translucent body portions of the lures between the mirrors, at all angles, so that the lures will have a flashing appearance regardless of which angle the light enters and from which angle they are viewed.

The bodies are cast or molded as preferred and are preferably dipped in a silvering composition and then wiped on their exteriors, leaving only the mirror surfaces 12, the surface of the lures between the mirrors 12 remaining transparent or translucent like the remainder of the body 10.

The described form of Figures 1 to 4 shows the body made solid.

Figure 5:
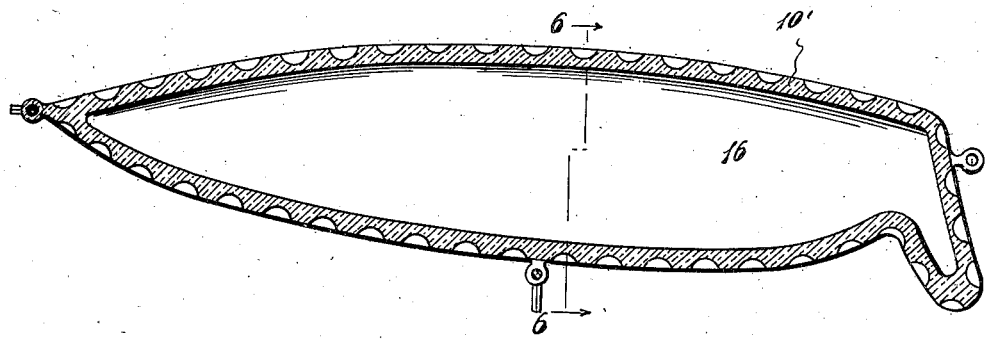
Figure 5 is a longitudinal sectional view through a modified form of lure.
Figure 6:
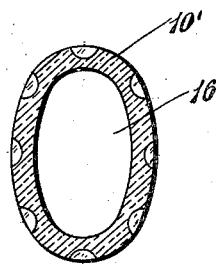
Figure 6 is a cross sectional view taken on the line 6—6 of Figure 5.
Figure 7:
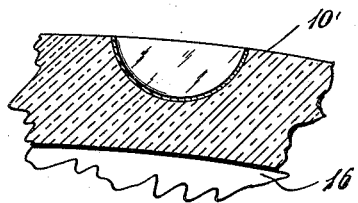
Figure 7 is an enlarged longitudinal sectional view through the lure of Figure 5.

In the modified form of Figures 5 to 7, a body 10' corresponding to that at 10 is made hollow as at 16, as shown. Otherwise, the body or lure is identical with that of the form of Figures 1 to 4.

Figure 8:
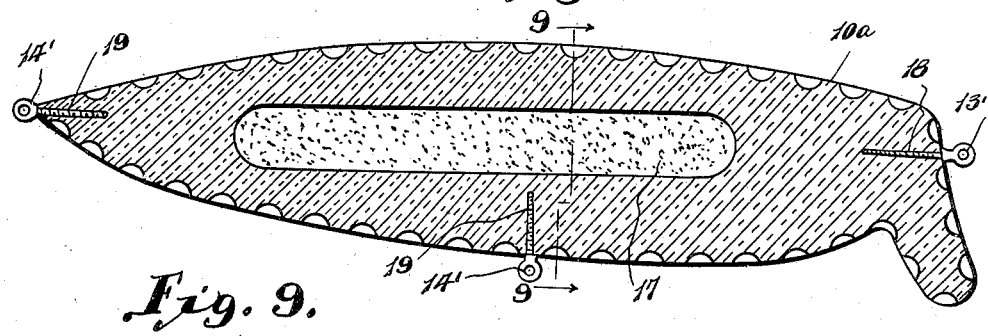
Figure 8 is a longitudinal sectional view through a further modified form.
Figure 9:
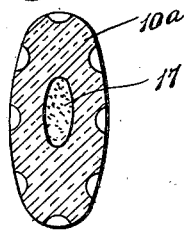
Figure 9 is a cross sectional view taken on the line 9—9 of Figure 8.

Another modified form is shown in Figures 8 and 9. Here the body is designated 10ª and conforms exactly with that at 10 except luminous material is provided interiorly thereof as at 17. In addition, eyes or eyelets 13' and 14' equivalent to those at 13 and 14, are shown as carried by anchor members 18 and 19, which are securely embedded in the body. Otherwise this form of the invention is identical with that of Figures 1 to 4.

Various additional changes may be resorted to within the spirit and scope of the invention.

I claim as my invention:—

A lure of the class described having a diaphanous body, said body having a multiplicity of recesses on its exterior surface, mirror means in said recesses, the body remaining diaphanous between the mirror means at the surface of the body, said body having luminous means on the interior thereof observable between the mirror means.

JAMES A. NEFF.